UNITED STATES PATENT OFFICE.

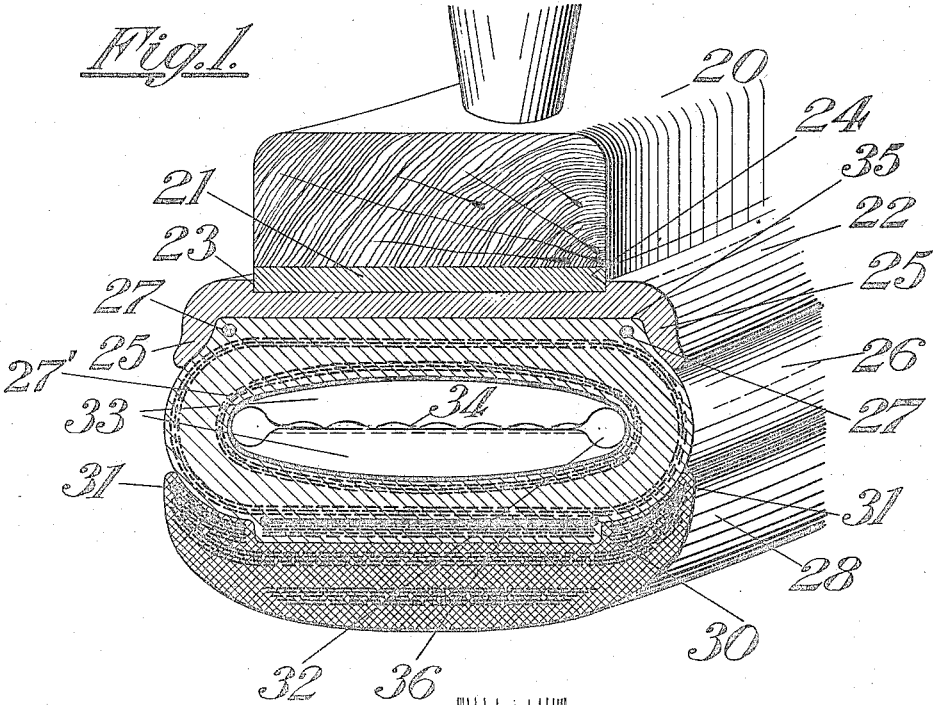
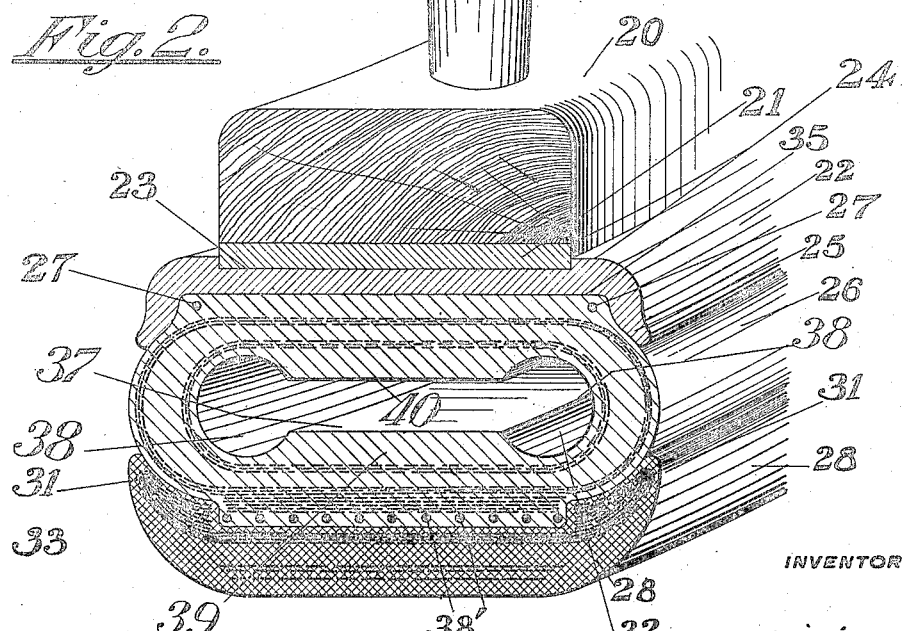

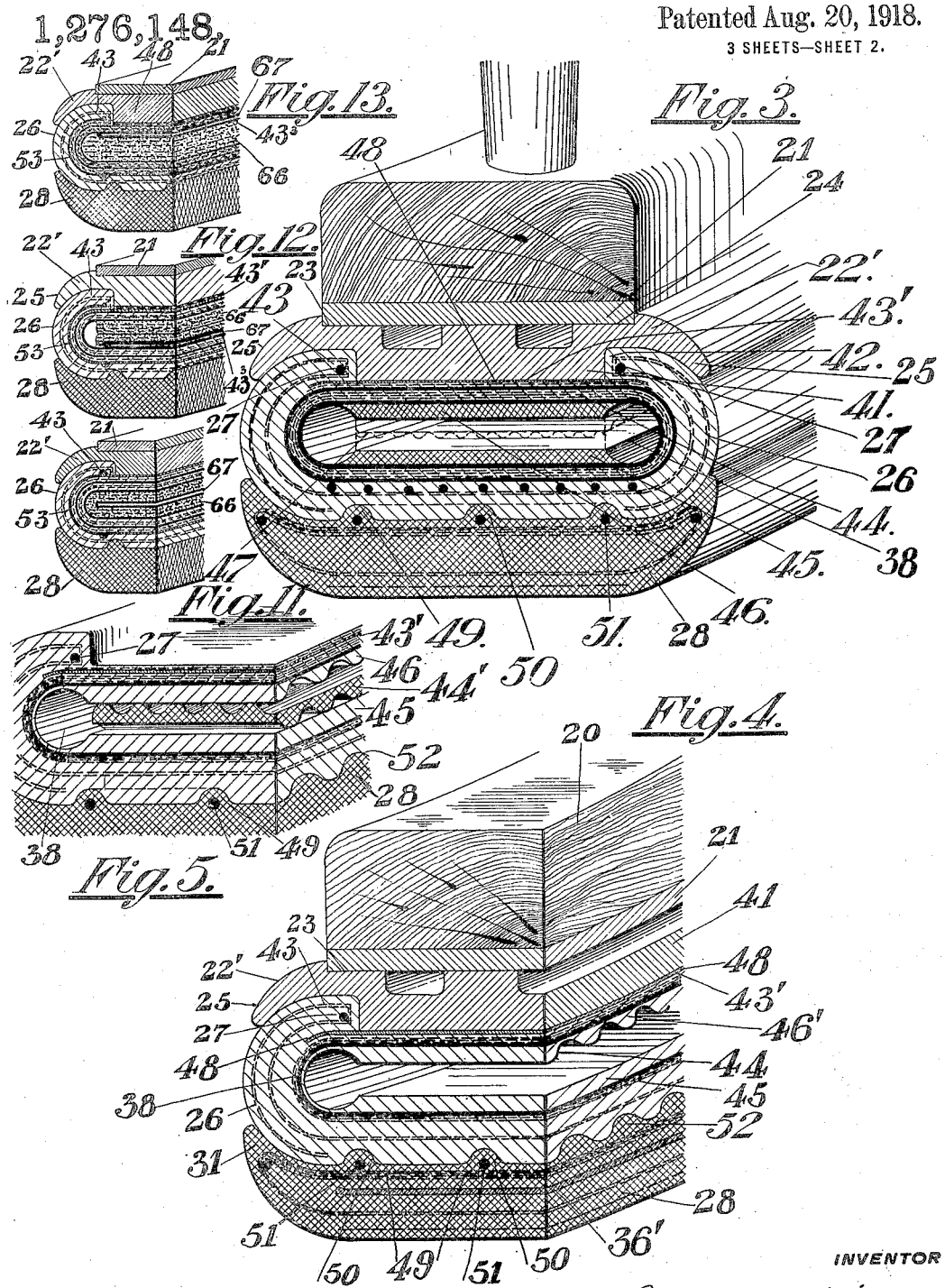

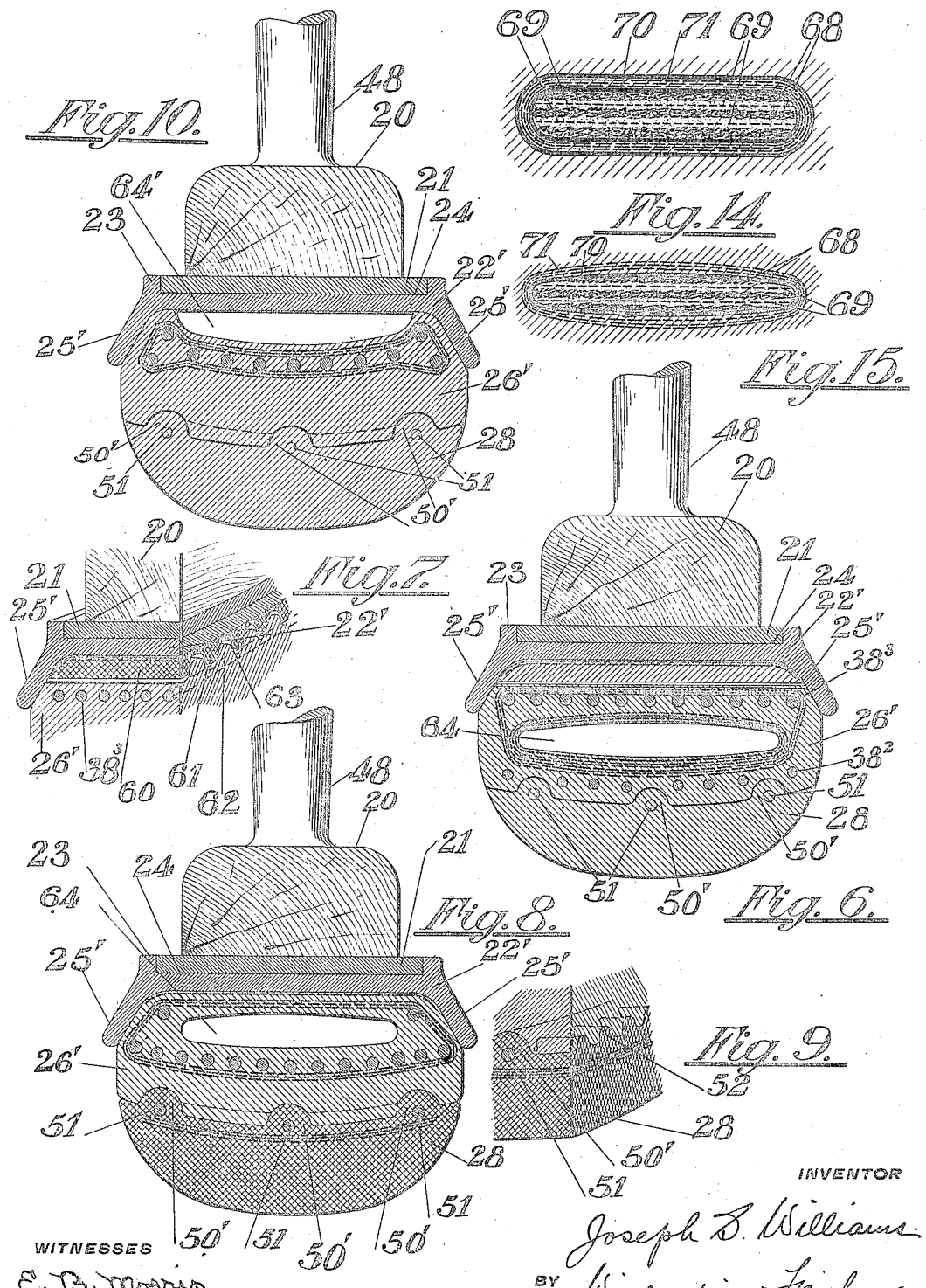

JOSEPH S. WILLIAMS, OF RIVERTON, NEW JERSEY.

RESILIENT CUSHIONING WHEEL EQUIPMENT.

1,276,148.          Specification of Letters Patent.      Patented Aug. 20, 1918.

Application filed December 8, 1909, Serial No. 532,046. Renewed November 20, 1917. Serial No. 203,059.

*To all whom it may concern:*

Be it known that I, JOSEPH S. WILLIAMS, a citizen of the United States, residing in Riverton, Burlington Co., and State of New Jersey, have invented a new and useful Resilient Cushioning Wheel Equipment.

My invention relates to a system of resilient cushion tire construction, and safety wheel equipments with detachable wearing shoe or part, and new and useful means of constructing and reinforcing such tire equipment against collapse or ineffective change of wheel diameter, whereby high standards of efficiency, safety and economy are secured in construction and use for various forms of tire construction with pneumatic, fluid, or viscous, or mobile, or elastic core elements or such in combination with resilient cushioning members or parts to maintain effective wheel diameter.

A purpose of my invention is to provide for the construction and use of resilient cushioning tires with detachable shoes or treads and cushioning cores consisting of ribbed, serrated, intersticed or stratified core members having uniformly disposed channels, spaces or cells circumferentially, and both circumferentially or transversely arranged to provide spacements for air or other suitable fluid, or a viscous, or mobile, or elastic material with suitable standard of fluidity, or mobility, or elasticity therewith in a suitable formed core chamber, whereby a predetermined wheel diameter will be maintained, and an effective fluid pressure standard of tread deflection, resiliency and load support will be provided.

A further purpose of my invention is to provide annular and laterally elongated cores of air or fluid under pressure and cushion with such depth as to limit tread deflection on effective fluid pressure lines, and correspondingly formed resilient cushioning member or part which will have a fluid pressure standard of compressibility filling material in automobile and vehicle tires in connection with extended lateral support for the tires upon the rim side where desired, and with separable outer shoes in engagement with the cushioning portion of the tire.

A further purpose of my invention is to provide for independent and separable tire shoes engaging with a single tube or outer casing and inner cushioning member characterized by a laterally alongated cushioning member preferably of width approximating that of the rim of resilient solid material with a standard of compressibility in depth per unit area thereof and limitation of deflection of tread comparable with effective fluid pressure.

A further purpose of my invention is to provide a laterally elongated interior or tire seating cushion member with direct supports across the rim against movement toward the rim and with extended support substantially to the lateral limit of the resilient core.

A further purpose of my invention is to provide a separable shoe having a core or cushioning member with such characteristics and such depths as to provide for and maintain a practically constant operative deflective load line.

While I have chosen to illustrate a variety of forms and structure by means of which my invention may be carried out, I desire to emphasize the fact that these various forms are not intended to be complete as showing all of the forms which might be used, but are known to me now to be incomplete. The extent of showing made by me has therefore been for more illustration and without attempt at completeness.

Figure 1 is a transverse section and perspective of a structure embodying my invention.

Figs. 2 and 3 are corresponding perspective views partly in transverse section of other structures embodying my invention.

Fig. 4 is a perspective having two planes thereof in section and of a modification of the structure in Fig. 3.

Fig. 5 is a perspective having two planes in section of a portion of the structure of Fig. 4 and showing additional matter.

Fig. 6 is a transverse section of another form of my invention.

Fig. 7 is a portion of a perspective showing two planes thereof in section and illustrating the structure of Fig. 6.

Fig. 8 is a transverse section of another form of my invention.

Fig. 9 is a portion of a perspective of the structure shown in Fig. 8 with two planes thereof in section.

Fig. 10 is a transverse section of a rim and tire showing still another form of my invention.

Figs. 11, 12 and 13 are perspectives having two planes each in section showing further forms embodying my invention.

Figs. 14 and 15 are transverse sections showing additional forms of cushioning member which may be made use of by me.

While I have shown a structure for retaining my tire upon the rim, which is, moreover, capable of use with any form of tire having a completed seating to fit the parts, I do not claim this structure *per se* in this application nor do I here claim the method of assemblage of the parts without the detachable shoe equipment, reserving both of these subjects matter for another application intended to be co-pending herewith. I therefore describe the structure and method here merely for the purpose of completeness and in order that this case may afford foundation for a division upon either or each of these subjects should this be desirable.

Referring to the drawings—

20 shows a rim having facing 21 thereon upon which transversely divided spring ring 22 is adapted to fit and interlock, the facing 21 lying between the parts 23 and 24 of member 22.

I prefer to provide this with ample width and with supporting tire gripping flanges 25 to protect tire 26 from lateral strain and to support it broadly and practically to the extreme lateral edges thereof, it being desirable to support the tire laterally at least to the approximate line of the core on each side.

I have illustrated the tire 26 as reinforced at 27 for the purpose of adding rigidity and preventing torsional displacement of the tire, and to support the core and resist internal pressure, and I have further provided the tire 26 with a separable wearing shoe 28 adapted to interfit with the tire as shown at 29 and 30, preferably placing the tire within the shoe under interior pressure causing considerable gripping action there-between, and inter-locking by transverse ribs or corrugations where this is desirable.

I provide the shoe 28 with annular side flanges 31 for the purpose of supporting against lateral displacement and torsion, subject to the limitation that excessive height of these flanges would cause difficulty in placing the tire within or possibly prohibit such placement.

I form the tire casing 26 either as a closed tube or core tire for use with a core of air, or other fluid, or of any other suitable cushioning material, or with both such mediums as shown for example in Figs. 1, 4 and 5 respectively, or as an inwardly opening tire providing for insertion of an air, or fluid or other cushion or a combination thereof as best seen in Figs. 3, 4, 5 and 10.

In the form in Fig. 1, I show an air or fluid part or member 32 where air or fluid may be maintained under pressure, either to provide the sole supporting cushion for the tire, or in connection with an auxiliary cushion 33. I have shown this auxiliary cushion 33 as made of two members lying above and below the center line of the chamber and as approaching each other near enough at 34 to provide the entire cushion and to be in contact unless compressed by fluid pressure to cause separation thereof. Where these two are used without air or fluid pressure, I would prefer placing them under compression obtaining the compression initially by any suitable wrapping or binding thereabout, and building the entire core casing structure upon them while in this condition. The parts 33 preferably provide spacing for fluid passage at 34 so that the parts 33 will be radially compressed by fluid pressure, and I prefer to select and proportion the parts 34 so that they shall compress to a separation not greatly different from and preferably in excess of the greatest radial depth of normal tread deflection when fluid is introduced having a pressure corresponding to that of effective fluid pressure as now employed.

Whatever the character of the cushion used by me I aim to make its width (axially) greater than its depth (radially), and to provide such radial compressing distance as to maintain effective wheel diameter in order to have as little variation from the designed load deflection as possible, whether the tire be operating under air or fluid pressure, or deflated, according to the load. In other words, the cushioning solid parts as shown in Figs. 1, 3, 5, 11, 12 and 13 are provided with such standards of compressibility radially per unit area as to support the load with an effective fluid pressure condition of deflection of tread. The importance of such conditions will be recognized if a moment's consideration be given to the disastrous effect of sudden alteration of tire radii upon the wheels.

I prefer to assemble the structure shown in Fig. 1 as follows:

The outer shoe 28 is held in position, while the outer casing 26, carrying the core and parts 33—33 is inwardly kinked at one or more points of its circumference to cause an effective decrease in the circumferential outer boundary lines of this portion of the tire. It is then inserted within the shoe 28 and allowed to resume its normal shape. The interior diameter of the shoe is made very slightly less than the full exterior diameter of the outer part 26 of the tire. The portion 26 is inserted within the shoe preferably while the cushion is deflated, if the cushion be of a type, making use of air or fluid pressure. The split ring 22 is bent inwardly or outwardly at the point of division so that the two ends are no longer circumferentially in line and member 22 is then sprung circumferentially so that the ends lap and the diameter is decreased until this ring can be placed within and against the inner surface of the tire, so as to form an effective seat therefor. The spring of the member 22 tends to compress the material of the tire, pressing outwardly. The member 22 is then forced back to its normal position to bring any desired degree of compression strain upon the tire. In tires which are to make use of fluid or mobile core content I prefer to place the ring 22 within the tire in this manner before any air, fluid, mobile or elastic material is placed in the tire. The split member 22 is now expanded circumferentially, expanding the tire seating parts correspondingly until the diameter is sufficient to permit the member 22 to be passed over the rim, after which the member 22 is released from its circumferential expanding strain and allowed to rest upon the facing 23 of the rim tire 21. The previous compression of the tire parts causes a restrictive strain by them upon the member 22 which is then communicated to the facing or rim 21 binding the parts firmly together with all parts under compression. To provide for the expansion of the member 22 in order that it may be passed over the outer effective surface of the rim 21, sufficient compressible, elastic and resilient material is placed between the reinforcement 27 and the edge or seat at 35, to permit of compression at this point without cutting off the tire parts, securing such tension on the reinforcement 27 as may be desired.

The compression condition of all of the parts is quite desirable to avoid creeping, prevent access of dust and dirt between, and maintain a desirable condition of partial compression of the resilient parts.

In the shoe seen in Fig. 1, I use a circumferential metallic resilient member 36 to smooth out the deflection due to impact, transmitting a less acute and abrupt deflection to the resilient member of the tire. It affords protection also against puncture and other injury, and a longitudinal elongation of tread deflection and load support.

The form shown in Fig. 2 differs from that in Fig. 1, in that I provide a different shape of resilient, or mobile fluid pressure and load cushioning core chamber at 37 from the elliptical form shown in Fig. 1, giving enlarged cylindrical openings at 38 therein to reduce the injurious effects of the relatively short bend or turn at the edges and providing abutting faces 39 and 40, capable of engagement and compression against each other when the air, fluid, or mobile material in the chamber has been compressed beyond the distance normally separating them, or in case of deflation. I also here show reinforcing rods or strips 38' there shown within the outer part of the casing 26 for the purpose of supporting it in contact with the shoe 28 in case of deflation where the air or fluid is mainly relied upon, and for accomplishing an additional purpose of smoothing out the deflection due to impact. This form of reinforcement must be sufficiently flexible to permit of deflection under the normal operation of the tire.

In the form shown in Fig. 3 I show a modified form of demountable member 22' which is transversely divided as with 22 and has an extension 41 adapted to enter the space between the terminals 42 and 43 of a circumferentially inwardly opening tire and to rest directly against the cushion, or against an intermediate annular transversely divided reinforcing and seating member 43. I have shown the annular band 43' as directly supporting the surface of an inner tube or cushioning member 44 which is here illustrated as having cushions 45, 46 of such material within a laterally elongated core as will limit the radial movement to a deflective load line of tread. The spacement or distance between the cushion faces 39 and 40 is shown in excess to the depth of tread deflection under effective fluid pressure, and may represent compression to that or a greater extent. The extent to which the cushions 45—46 approach each other may be adjusted to the particular conditions desired, and in dotted lines I have shown their possible extension to meet each other at 47 with spacement between them for fluid, or mobile or elastic material. Where these cushions actually engage each other with spacement for fluid passage, I prefer to make them with such extent of compressibility and resistance to compression radially per unit area as to equal standard air or fluid pressure for corresponding tire purposes, as in Figs. 11, 12 and 13, and otherwise with any greater or less range of compressibility.

The manner of assembling this tire and rim is substantially the same as that of the structure shown in Fig. 1. The face 48 of the annular and transversely elongated and divided member 22' is compressed either directly against the cushioning member or on annular gripping and reinforcing member 43' which is thrown out upon the cushioning member of core 44.

Whether air pressure or abutting cushions be used for the core 44 the effect is the same, that the pressure upon the circumferential inner face of the core is transmitted through the inner face of the casing and against the shoe, all of the parts being thus maintained in expansive engagement with each other to the same effect as the structure of Fig. 1.

In the form shown from the view in Figs. 3 and 4, it will be seen that the shoe 28 may engage with the tire casing by means of circumferential grooves 49 in the casing and ribs 50 in the shoe which may be of any required number and which assist in prevention of movement of the sides relative to each other. Reinforcement 51 may be used within these ribs or within other suitable adjoining structure of the shoe itself, or, for that matter, in any part of the shoe to strengthen it against strain and displacement.

From the form shown in Fig. 4 it will be seen that transverse ribs or corrugations 52 may be made use of interfitting between the shoe and tire casing as an additional safe guard against creeping of the one with respect to the other.

In Fig. 4 an annular transversely elongated resilient reinforcement 36' is shown embodied in the shoe and with other reinforcements as shown in Fig. 3. The cushioning core part 44 having the annular cushioning parts 45 and 46' are shown with a fluid spacement between them, which may be normal or as may result under fluid pressure with such predetermined depth radially as will provide for cushioning the load with any desired pre-determined deflection of tread, due to varying degrees of inflation or to deflation.

The cushioning part 46' is shown with the grooves or channels transversely disposed to secure greater resiliency or range of deflection in such parts in cushioning upon the member 45.

The enlarged openings 38, also shown in Fig. 2 and others of the drawings, provide a wide range of flexure at the sides of the core and casing without injury thereto.

The other parts in Fig. 4 are similar to those shown in Fig. 3 as will also be seen as by figures of reference.

Fig. 5 shows the detachable shoe 28 without the reinforcement 36' as in Fig. 4 and a resilient cushioning medium or mattress 44' with annular transversely and disposed projections, ribs and channels for securing a uniform distribution of fluid, viscous, mobile, or elastic material in the core, with more or less of a laminated or filamentary character, between the cushioning parts, such mattress part 44', together with the coöperative parts 45 and 46, forming the unitary member 44 are provided with such standards of compressibility, as to be reduced in volume by fluid, mobile, highly elastic material under pressure within the core to any pre-determined degree or standard of depth of fluid core radially per unit area, and preferably subsequently compressed in volume so as to equal or exceed the volume of fluid displaced by the maximum deflection of tread.

Fig. 6 shows a system of tire construction and wheel equipment using the casing 26' with the core chamber therein and having reinforcing rods or strips 38' within the outer part of the casing which is shown in co-fitting and interlocking engagement with the detachable wearing shoe 28.

The shoe 28 is shown with annular projections 50' with corresponding recesses of the outer face of the casing 26.

The projections 50 of the outer shoe 28 are shown as provided with reinforcements 51 adapted to operate as described with reference to other figures of the drawings.

The core casing 26' is shown provided on the inner part with reinforcement 38''' which serve to reinforce the casing in its seating in the channeled part of the annular transversely divided member 22'.

The annular member 22' is adapted to operate the same as the member 22 described in connection with other figures of the drawings.

The extensions 25' of the member 22' serve to receive the tire seating and the seating of the member 22' is shown in engagement with the tire 21 of the rim 20 with the parts 21 and 22' in cofitting and interlocking engagement by means of the inwardly projecting parts 23 and 24 of the member 21'.

The core chamber 64 as shown in Fig. 6 may be filled with air or other fluid under compression, or with any suitable viscous, or mobile material under compression or with core members as shown in Figs. 14 and 15 and other figures of the drawings.

In case of the employment of cores as shown in Figs. 3, 4, 11, 12 and 13 the spacements or interstices or apertures in such cores can be filled with air or other fluid under compression, or with any suitable viscous, or mobile material, or with a suitable solid elastic material which will provide the requisite elasticity for effective tread deflection, and coöperate with other parts of the core to maintain a practical consistency of wheel diameter, and otherwise support the load with a resiliency per unit area of tread comparable with effective fluid pressure as now employed in tire construction.

In Fig. 7 an interlocking cushion seating 60, is shown with projecting interlocking faces 61 fitting into the cofitting interlocking faces 62 of the seating part of the casing 26'.

Spacement 63 is shown between the faces 61 and 62 by which a free movement of the tread radially is provided to effect mobility of tread to the extent desired to secure requisite tread deflection, or area of tread to support the load, partly through the medium of such spacements and the resiliency co-acting of the faces 61 and 62, which are preferably so standardized in elasticity and resiliency as to be comparable with effective fluid pressures as now employed in tire construction.

Figs. 8 and 10 show my system of tire construction and wheel equipment similar to the showing in Fig. 6 with slight modifications in the construction and arrangement of the casing 26', by which the core chamber or resiliency core member or part of the tire are inclosed.

The core chamber 64 in Fig. 8 is shown surrounded by the casing 26' and located nearer the seating upon the member 21' than in Fig. 6.

In Fig. 10 the casing 26' is shown with an annular channeled, or chambered part which forms a core chamber 61' when the member 26' is seated upon the annular transversely divided member 21'.

The core chamber 64' is therefore in such case formed between the members 26' and 21', when such parts are placed in co-fitting engagement or as in wheel equipment.

The core chamber under such construction can be filled with a fluid tight tube containing air or other fluid, or viscous, or mobile material under suitable compression, with or without solid cushioning material combined therewith or any suitable core member as herein described, or such chamber with any suitable elastic material which may be forced into such chamber by any suitable well known means or placed therein prior to locating and forcing the member 22 on the seating of the casing 26'.

The other parts as shown in Figs. 8 and 10 will be seen to be similar to like parts in other figures of the drawings having like figures of reference.

Fig. 9 shows a sectional and perspective view of the shoe 28 with circumferential projecting parts 50', reinforcement 51 and transverse projecting parts 52, which are adapted to cofit and interlock with the outer faces of the member 26', as shown in Figs. 6, 8, 10 and others of the drawings.

Figs. 11, 12 and 13 show the detachable shoes 28 in co-fitting engagement with the outer faces of the casings 26, having resilient cushioning cores therein. The casings and cores are in compressive engagement with the annular transversely divided demountable members 22', which are engaged and are interlocked with rim 21.

In these figures the elastic cores 66 are shown provided with passageways 67 within which air, fluid, or viscous material may be forced to compress the solid material of the core to such degree as will provide the requisite depth of fluid or mobile support, giving mobility for effective tread deflection, by displacement of the solid cushioning material, maintaining as in all my cores practically constant wheel diameter under all conditions of inflation or deflation with a load supporting standard compressibility and resiliency per unit area of such cushioning core to correspond with effective fluid pressure tires as at present used. It will be seen that the passageways 67 of the core 66 are arranged to practically cover the area of the cores, so that when fluid is forced into such passageway or spacement, the cores will be compressed radially in proportion as the volume of the fluid is increased.

It is evident that by so compressing the cores to an extent equal to, or in excess of the radial depth of the normal effective deflection of tread, free mobility of tread deflection with any predetermined radial range thereof will be secured under load action, and that the resilient cushioning core part 66 will compensate variation of inflation, or pressure of fluid in the core.

Figs. 14 and 15 show elastic core construction of annular transversely elongated types for use in the core chamber 64', or instead of cores shown in other figures of the drawings, the core chambers of course being shaped to fit the cores selected.

These cores are shown composed of suitable elastic material 68 with layers of fibrous material 69, which act as reinforcement therefor. The parts 68 and 69 are shown enveloped by an outer casing 70 reinforced by fiber 71 intended preferably for use in the core chamber 64.

The annular and transversely elongated cushioning construction with closed outer casings as shown in Figs. 1, 2, 6 and 8 and with inwardly opening outer casings as shown in Figs. 3, 4, 10, 11, 12 and 13 are well adapted to be equipped with the outer detachable annular wearing shoes or casings.

In Fig. 2 the spacement between the cushioning faces may represent the position after compression by the filling material under normal tire pressure, as in Fig. 1, with a correspondingly increased cushioning resistance therebeyond, or such spacements may normally represent the position of the faces for safety wheel diameter and possess a cushioning resistance per unit area equivalent to a determined fluid pressure load supporting standard, so as to support the load with uniformity upon a practically constant or normal deflective load line of distribute support in case of failure to the filling in such spacement.

In all of the forms the fluid or mobile material can be put in either before or after the mounting of the tire. The casing may be strengthened transversely and annularly by fibrous or other reinforcement, or the core itself may contain or be surrounded by fiber or other stiffening material, distributing the deflective pressures and preventing transverse distortion.

This invention is not limited to the radial depth of the cushioning core members or to the exact spacements in the annularly and transversely disposed cushioning material of such core members or to the radial depth of the cushioning core chambers or parts of the inwardly opening or closed cushioning types, as it is evident the variation in dimensions can be made by varying the range of compressibility of the material employed. It will now be apparent that in my present invention an annular and transversely elongated body is provided of flattened arch formation having resilient supporting abutments in the sides with a formation which is cofittable with the seating member. Flexible tensile means are provided which provide for circumferential inextensibility in the flattened arch formation. Across the body and in the side supporting abutments are tensile reinforcements, and a clearance is formed between the flattened arch formation and the inner seating member and the side supporting abutments, which provides for definite ranges of resilient movements. The tread has a flattened arch formation at its inner portion and is carried by the flattened arch formation of said body.

I provide a resilient wheel equipment in which a detachable tread member is resiliently supported and maintained in locked engagement with an annular and transversely elongated, resilient, inner collapsible body which is adapted to have its inner portion cofit in locked engagement about the peripheral seating portions of a wheel, whereby the tread, resilient body and inner supporting parts about the periphery of the wheel and any suitable means are provided for supporting and maintaining the annular body in proper fixed alinement about the wheel and in resilient cofittable locked engagement with the tread which is detachable from said body only when the body is detached from the wheel whereby definite ranges of resilient movements and non-collapsibility and absolute security are attained by such equipment when secured to the wheel.

It is important that the outer wearing shoe shall have as little transverse deflection as possible, shall be supported against collapse under load when the fluid pressure has been released, shall be retained against slipping circumferentially and stripping transversely and shall be in such intimate contact with the outer tire casing as to operate substantially as a unit therewith, avoiding friction thereagainst, preventing accumulation of dirt therebetween at all times coöperating with the outer casing to limit and distribute deflective strains and assisting in the attainment and maintenance of the required standards for the tire and all of its parts.

Having thus described my invention, what I claim as new and desire to secure by Letters Patent, is:

1. A resilient tire, comprising an inner support, an annular and transversely elongated tension belt having flattened formation in spaced relationship about said support, a yielding flexible cushion between said support and tension belt, said tension belt and cushion providing definite ranges of resilient movements and non-collapsible resilient support under load about said inner support and ranges of resilient movements radially of approximately three-eighths of an inch altitude of tread deflection along the plane of road, and a detachable tread, said belt and tread having means to form a locking engagement with each other under inflation and deflation of the cushion.

2. A resilient tire, comprising an inner support, an annular and transversely elongated tension belt having flattened formation in spaced relationship about said support with curvatures about the sides to said inner support, a yielding flexible cushion, said tension belt and cushion providing definite ranges of resilient movements and non-collapsible resilient support under load about said inner support and ranges of resilient movements radially of approximately three-eighths of an inch altitude of tread deflection along the plane of road, and a detachable tread, said tread and belt having means to form a locking engagement with each other under inflation and deflation.

3. A resilient tire, comprising an inner support, an annular and transversely elongated tension belt having flattened formation in spaced relationship about said support, a yielding flexible cushion between said support and tension belt, said tension belt and cushion providing definite ranges of resilient movements and non-collapsible resilient support under load about said inner support and ranges of resilient movements radially of approximately three-eighths of an inch altitude of tread deflection along the plane of road, means to vary the tension of said support and cushion about said support, and a detachable tread, said tread and belt having means to form a locking engagement with each other under inflation and deflation.

4. A resilient tire, comprising an inner support, an annular and transversely elongated tension belt having flattened formation in spaced relationship about said support, a yielding flexible cushion between said support and tension belt, said tension belt and cushion providing definite ranges of resilient movements and non-collapsible resilient support under load about said inner support and ranges of resilient movements radially of approximately three-eighths of an inch altitude of tread deflection along the plane of road, means in said tire between said support and belt to receive and confine mobile contents under pressure, and a detachable tread, said tread and belt having means to form a locking engagement with each other under inflation and deflation.

5. A tire, comprising an annular, transversely elongated resilient body having its tread portion lying within a circle formed by a radius of one-half the major transverse axis of the tire, and having tensile reinforcements located on opposite sides of such axis and extending transversely of the tire in flattened formation across the median line with curvatures at the sides extending to inner peripheral seating parts, in combination with yielding flexible means to support, with or without inflation, the tensile reinforcements and tread in resilient, spaced, and non-collapsible load supporting relationship about said seating parts, and a detachable tread, said body and tread having means to form a locking engagement with each other under inflation and deflation of the body.

6. A tire, comprising an annular, transversely elongated resilient body having its tread portion lying within a circle formed by a radius of one-half the major transverse axis of the tire, and having tensile reinforcements located on opposite sides of such axis and extending transversely of the tire in flattened formation across the median line with curvatures at the sides extending to inner peripheral seating parts, in combination with yielding flexible means to support, with or without inflation, the tensile reinforcements and tread in resilient, spaced, and non-collapsible load supporting relationship about said seating parts and so as to provide definite ranges of resilient movements radially and along the plane of road contact of the tire, and a detachable tread, said body and tread having means to form a locking engagement with each other under inflation and deflation of the body.

7. A resilient tire, comprising an inner support, an annularly and transversely disposed tension belt, a tread outwardly of said tension belt in spaced relationship about said support, a yielding, flexible cushion, a fluid-tight portion providing clearance space for resilient movements of said belt and cushion, mobile contents under pressure in said space, said tension belt and cushion providing non-collapsible resilient support and definite ranges of resilient movements about said inner support and along the plane of road contact with slight variations in ranges of resilient altitude with and without mobile contents under pressure, and a detachable tread, said belt and tread having means to form a locking engagement with each other under inflation and deflation of the tire.

8. A resilient tire, comprising an inner support, an annularly and transversely disposed tension belt extending with curvatures about the sides to said inner support, a tread outwardly of said tension belt in spaced relationship about said support, a yielding, flexible cushion, a fluid-tight portion providing clearance space for resilient movements of said belt and cushion, mobile contents under pressure in said space, said tension belt and cushion providing non-collapsible resilient support and definite ranges of resilient movements about said inner support and along the plane of road contact with slight variations in ranges of resilient altitude with and without mobile contents under pressure, and a detachable tread, said belt and tread having means to form a locking engagement with each other under inflation and deflation of the tire.

9. A tire, comprising an inner support, an annular and transversely disposed tension member with curvatures about the sides to said inner support, means to maintain said member in tension and in spaced non-collapsible relationship about said support and to provide definite ranges of resilient flexing of said member under load, and a detachable tread, said member and tread having means to form a locking engagement with each other with or without inflation of the tire.

10. A resilient tire body having means to limit its resilient movement under load, and a detachable tread, said body and tread having means to form a locking engagement with each other under inflation and deflation of the body.

11. A resilient wheel equipment, comprising a resilient annularly and transversely elongated non-collapsible flexible body having means to limit resilient movement under load, a detachable tread, said body and tread having means to form a locking engagement with each other, and means about the inner periphery of said body maintaining said body and said tread in resilient and locked relationship about the periphery of the wheel.

12. A resilient wheel equipment, comprising a resilient annular and transversely elongated flexible and non-collapsible body having means to provide definite ranges of resilient movements and limit the range of such movements under load, a detachable tread carried by said body in locked engagement therewith, annular and transversely disposed flexible and tensile reinforcements in the inner portion of said tread in flattened relationship to the major transverse axis of said body, limiting circumferential extensibility, annular and transverse tensile reinforcements in the outer portion of said body, tensile reinforcements in and about the sides of said body to the inner peripheral seating parts thereof, co-fitting locking means on the adjoining faces of said body and tread providing against separation thereof with the range of resilient movements of said body and tread under load, and means in and about the inner peripheral parts of said body maintaining said body and tread in locked, resilient, non-collapsible relationship about the periphery of the wheel.

JOSEPH S. WILLIAMS.

Witnesses:
H. S. FAIRBANKS,
C. D. McVAY.